US007210006B2

(12) United States Patent
Cypher

(10) Patent No.: US 7,210,006 B2
(45) Date of Patent: *Apr. 24, 2007

(54) COMPUTER SYSTEM SUPPORTING READ-TO-WRITE-BACK TRANSACTIONS FOR I/O DEVICES

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 10/610,360

(22) Filed: Jun. 30, 2003

(65) Prior Publication Data

US 2004/0073754 A1 Apr. 15, 2004

Related U.S. Application Data

(60) Provisional application No. 60/392,566, filed on Jun. 28, 2002.

(51) Int. Cl.
*G06F 12/08* (2006.01)

(52) U.S. Cl. .................. 711/145; 711/155; 711/144

(58) Field of Classification Search ............. 711/146, 711/141, 145, 144, 155, 143, 147
See application file for complete search history.

(56) References Cited

U.S. PATENT DOCUMENTS 5,276,852 A * 1/1994 Callander et al. ........... 711/143

(Continued)

FOREIGN PATENT DOCUMENTS

| EP | 0735484 | * 10/1996 |
|---|---|---|
| EP | 0735485 | * 10/1996 |

OTHER PUBLICATIONS

"Specifying and Verifying a Broadcast and a Multicast Snooping Cache Coherence Protocol", Sorin, et al, *IEEE Transactions on Parallel and Distributed Systems*, vol. 13, No. 6, Jun. 2002, http://www.cs.wisc.edu/multifacet/papers/tpds02_lamport.pdf.

(Continued)

*Primary Examiner*—Pierre-Michel Bataille
(74) *Attorney, Agent, or Firm*—Meyertons Hood Kivlin Kowert & Goetzel, P.C.; B. Noël Kivlin

(57) ABSTRACT

A read-to-write-back transaction may allow I/O subsystems (or other devices) to perform a write to a portion of a cache block without gaining ownership of the cache block and requiring that it respond to foreign requests for the cache block. In response to an I/O subsystem initiating a read-to-write-back transaction, the device owning the cache block conveys the cache block to the I/O subsystem, and the I/O subsystem may perform partial or entire writes to the cache block. Subsequently, the cache block is written back to a memory subsystem from the I/O subsystem. The system is implemented such that these operations may be viewed logically as an atomic operation with respect to other coherence transactions to the same cache block, and thus the I/O subsystem need not become the owner of the cache line during performance of the read-to-write-back transaction. Accordingly, the design of the I/O subsystem may be simplified while still providing the overall functionality as supported by the read-to-write-back transaction.

16 Claims, 11 Drawing Sheets

| Packet Type | Full Name | Address Space | | Description |
|---|---|---|---|---|
| | | Cacheable | I/O | |
| RTS | ReadToShare | Y | | Requests read-only copy of cache line |
| RTO | ReadToOwn | Y | | Requests writable copy of cache line |
| RTWB | ReadToWriteBack | Y | | Requests to receive writable copy of cache line and send cache line to memory |
| RS | ReadStream | Y | | Request read-once copy of cache line |
| WS | WriteStream | Y | | Request to write entire cache line and send to memory |
| WB | WriteBack | Y | | Request to send cache line from owning device to memory, device does not keep copy |
| WBS | WriteBackShared | Y | | Request to send cache line from owning device to memory, device keeps read-only copy |
| RIO | ReadIO | | Y | Request to read IO locations |
| WIO | WriteIO | | Y | Request to write IO locations |
| INT | Interrupt | | | Sends an interrupt, target is specified by address |

U.S. PATENT DOCUMENTS

| | | | |
|---|---|---|---|
| 5,428,761 | A * | 6/1995 | Herlihy et al. ............... 711/130 |
| 5,655,100 | A * | 8/1997 | Ebrahim et al. ............ 711/144 |
| 5,761,721 | A | 6/1998 | Baldus et al. |
| 5,802,582 | A | 9/1998 | Ekanadham et al. |
| 5,829,033 | A * | 10/1998 | Hagersten et al. .......... 711/141 |
| 5,978,874 | A * | 11/1999 | Singhal et al. ............... 711/146 |
| 6,088,768 | A | 7/2000 | Baldus et al. |
| 6,209,064 | B1 | 3/2001 | Weber |
| 6,662,277 | B2 * | 12/2003 | Gaither ....................... 711/145 |
| 6,766,360 | B1 * | 7/2004 | Conway et al. ............. 711/141 |
| 2004/0268055 | A1 * | 12/2004 | Landin et al. ............... 711/144 |

OTHER PUBLICATIONS

"Multicast Snooping: A New Coherence Method Using a Multicast Address Network", Bilir, et al, *The 26th International Symposium on Computer Architecture*, IEEE, Atlanta, GA, May 2-4, 1999, http://csdl.computer.org/comp/processings/isca/1999/0170/00/01700294abs.htm.

"Architecture and Design of AlphaServer GS320", Gharachorloo, et al, *ACM Sigplan Notices*, vol. 35, Issue 11, Nov. 2000, http://portal.acm.org/citation.cfm?id=356991&dl=ACM&coll=portal.

"View Caching: Efficient Software Shared Memory for Dynamic Computations", Karamcheti, et al, *11th International Parallel Processing Symposium*, Geneva, Switzerland, Apr. 1-5, 1997, http://ipdps.eece.unm.edu/1997/s13/318.pdf.

"Cache-Coherent Distributed Shared Memory: Perspectives on Its Development and Future Challenges", Hennessy, et al, *Proceedings of the IEEE*, vol. 87, Issue 3, Mar. 1999, ISSN 0018-9219, http://cva.stanford.edu/cs99s/papers/hennessy-cc.pdf.

"Survey on Cache Coherence in Shared & Distributed Memory Multiprocessors", Garg, et al, Online, http://www.cse.psu.edu/~cg530/proj03/cache_coherence.pdf.

"A Survey of Cache Coherence Mechanisms in Shared Memory Multiprocessors", Lawrence, Department of Computer Science, University of Manitoba, Manitoba, Canada, May 14, 1998, http://www.cs.uiowa.edu/~rlawrenc/research/Papers/cc.pdf.

"Bandwidth Adaptive Snooping", Martin, et al. *8th Annual International Symposium on High-Performance Computer Architecture (HPCA-8)*, Cambridge, MA, Feb. 2-6, 2002.

"Timestamp Snooping: An Approach for Extending SMPs", Martin, et al. *9th International Conference on Architectural Support for Programming Languages and Operating Systems (ASPLOS-IX)*, Cambridge, MA, Nov. 13-15, 2000.

* cited by examiner

| Packet Type | Full Name | Address Space | | Description |
| --- | --- | --- | --- | --- |
| | | Cacheable | I/O | |
| RTS | ReadToShare | Y | | Requests read-only copy of cache line |
| RTO | ReadToOwn | Y | | Requests writable copy of cache line |
| RTWB | ReadToWriteBack | Y | | Requests to receive writable copy of cache line and send cache line to memory |
| RS | ReadStream | Y | | Request read-once copy of cache line |
| WS | WriteStream | Y | | Request to write entire cache line and send to memory |
| WB | WriteBack | Y | | Request to send cache line from owning device to memory, device does not keep copy |
| WBS | WriteBackShared | Y | | Request to send cache line from owning device to memory, device keeps read-only copy |
| RIO | ReadIO | | Y | Request to read IO locations |
| WIO | WriteIO | | Y | Request to write IO locations |
| INT | Interrupt | | | Sends an interrupt, target is specified by address |

*Fig. 2*

| Transaction Type | Initiator Receives | Initiator Sends |
| --- | --- | --- |
| RTS | DATA | |
| RTO | DATA | |
| RTWB | DATA & PRN | DATA |
| RS | DATA | |
| WS | ACK & PRN | DATA |
| WB | PRN | DATA or NACK |
| WBS | PRN | DATA or NACK |

*Fig. 3*

| Transaction Type | Initiator Receives | Initiator Sends |
|---|---|---|
| RIO | DATA | |
| WIO | PRN | DATA |
| INT | PRN or NACK | DATA or Nothing |

*Fig. 4*

| Access Rights Symbol | Access Rights Name | Description | Data Present? |
|---|---|---|---|
| W | Write | Read and Write | Yes (or ACK) |
| A | All-Write | Write-only, must write entire cache line | Yes |
| R | Read | Read-only | Yes |
| T | Transient-Read | Read-only, read can be reordered | Yes |
| I | Invalid | No access rights | Yes or No |

*Fig. 5A*

| Ownership Status Symbol | Ownership Status Name | Description | Data Present? |
|---|---|---|---|
| O | Owner | Owns cache line | Yes or No |
| N | Not Owner | Does not own cache line | Yes or No |

*Fig. 5B*

| Access Right | Ownership Status |
|---|---|
| W | O |
| R | O |
| I | O |
| W | N |
| A | N |
| R | N |
| T | N |
| I | N |

*Fig. 5C*

| Transaction Type | New Owner |
|---|---|
| RTS | Previous Owner |
| RTO | Initiator |
| RTWB | Memory |
| RS | Previous Owner |
| WS | Memory |
| WB | Memory (or Previous Owner) |
| WBS | Memory (or Previous Owner) |
*Fig. 6*
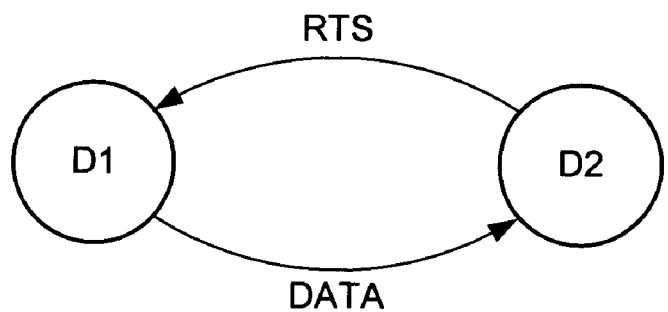
*Fig. 7A*
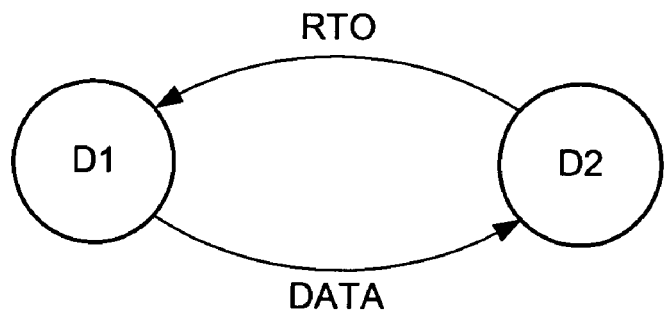
*Fig. 7B*

COMPUTER SYSTEM SUPPORTING READ-TO-WRITE-BACK TRANSACTIONS FOR I/O DEVICES

This application claims benefit of priority to U.S. Provisional Application No. 60/392,566 filed Jun. 28, 2002.

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory.

Shared memory multiprocessing systems generally employ either a snooping cache coherency protocol or a directory based cache coherency protocol. In a system employing a snooping protocol, coherence requests are broadcast to all processors (or cache subsystems) and memory through a totally ordered address network. Each processor "snoops" the requests from other processors and responds accordingly by updating its cache tags and/or providing the data to another processor. For example, when a subsystem having a shared copy of data observes a coherence request for exclusive access to the block, its copy is typically invalidated. Likewise, when a subsystem that currently owns a block of data observes a coherence request to that block, the owning subsystem typically responds by providing the data to the requestor and invalidating its copy, if necessary. By delivering coherence requests in a total order, correct coherence protocol behavior is maintained since all processors and memories observe requests in the same order.

The other standard approach to cache consistency uses a directory-based protocol. In systems that implement a directory-based protocol, both the address network and the data network are typically point-to-point, switched networks. When a processor requests a cache block, the request is sent to a directory which maintains information regarding the processors that have copies of the cache block and their access rights. The directory then forwards the request to those processors which must change their access rights and/or provide data for the request (or if needed, the directory will access the copy of the cache block in memory and provide the data to the requester). Since there is no way of knowing when the request arrives at each processor to which it is sent, all processors that receive the request must typically acknowledge reception by providing data or sending an acknowledge (ACK) message to either the requestor or the directory, depending on the protocol.

Shared memory microprocessing systems often include I/O (input/output) devices or other device types that do not cache data. Because they do not cache data, the interfaces to such devices may be simplified since they need not respond to the various coherence transactions that may be generated, as dictated by the particular coherence protocol. To allow an I/O device to perform a read operation to a cache block, some systems support read stream transactions in which an entire cache block is conveyed from a caching device to the I/O device. Similarly, to allow an I/O device to perform a write operation to a cache block, such systems may further support write stream transactions in which an entire cache block is sent from the I/O device and written within the caching device.

Although a system may allow I/O devices or other non-caching devices to read or write entire cache blocks, such systems typically do not allow an I/O device to obtain a cache block, make partial writes to the blocks and to subsequently write the modified cache block back to memory. Although various performance improvements could be attained, implementation of such functionality could also add significant complexity to the I/O device since the I/O device may be required to respond to foreign coherence transactions while it owns the cache block.

SUMMARY OF THE INVENTION

A computer system and method are disclosed in which read-to-write-back (RTWB) transactions are supported. A read-to-write-back transaction may allow I/O subsystems (or other devices) to perform a write to a portion of a cache block without gaining ownership of the cache block and requiring that it respond to foreign requests for the cache block. In response to an I/O subsystem initiating a read-to-write-back transaction, the device owning the cache block conveys the cache block to the I/O subsystem, and the I/O subsystem may perform partial or entire writes to the cache block. Subsequently, the cache block is written back to a memory subsystem from the I/O subsystem. The system is implemented such that these operations may be viewed logically as an atomic operation with respect to other coherence transactions to the same cache block, and thus the I/O subsystem need not become the owner of the cache line during performance of the read-to-write-back transaction. Accordingly, the design of the I/O subsystem may be simplified while still providing the overall functionality as supported by the read-to-write-back transaction.

In one embodiment, a computer system comprises a memory subsystem, a processing subsystem including a cache memory for caching data mapped to said memory subsystem, and a device configured to generate a read-to-write-back transaction for a given cache block. The processing subsystem is configured to transmit the given cache block to the device in response to the read-to-write-back transaction. The device is configured to modify the given cache block without gaining ownership of the given cache block.

BRIEF DESCRIPTION OF THE DRAWINGS

Other objects and advantages of the invention will become apparent upon reading the following detailed description and upon reference to the accompanying drawings in which:

FIG. 2 is a chart illustrating various transactions that may be supported in one embodiment of a computer system.

FIG. 3 illustrates data packet transfers in accordance with one embodiment of a computer system.

FIG. 4 illustrates various non-cacheable transaction types that may be supported in one embodiment of a computer system.

FIGS. 5A and 5B illustrates types of access rights and ownership status that are possible in one embodiment of a computer system.

FIG. 5C illustrates possible combinations of access rights and ownership status.

FIG. 6 is a chart illustrating ownership transitions in response to particular transactions in one embodiment of a computer system.

FIGS. 7A–7H illustrate exemplary coherence operations which may be implemented in one embodiment of a computer system.

Figure 1:
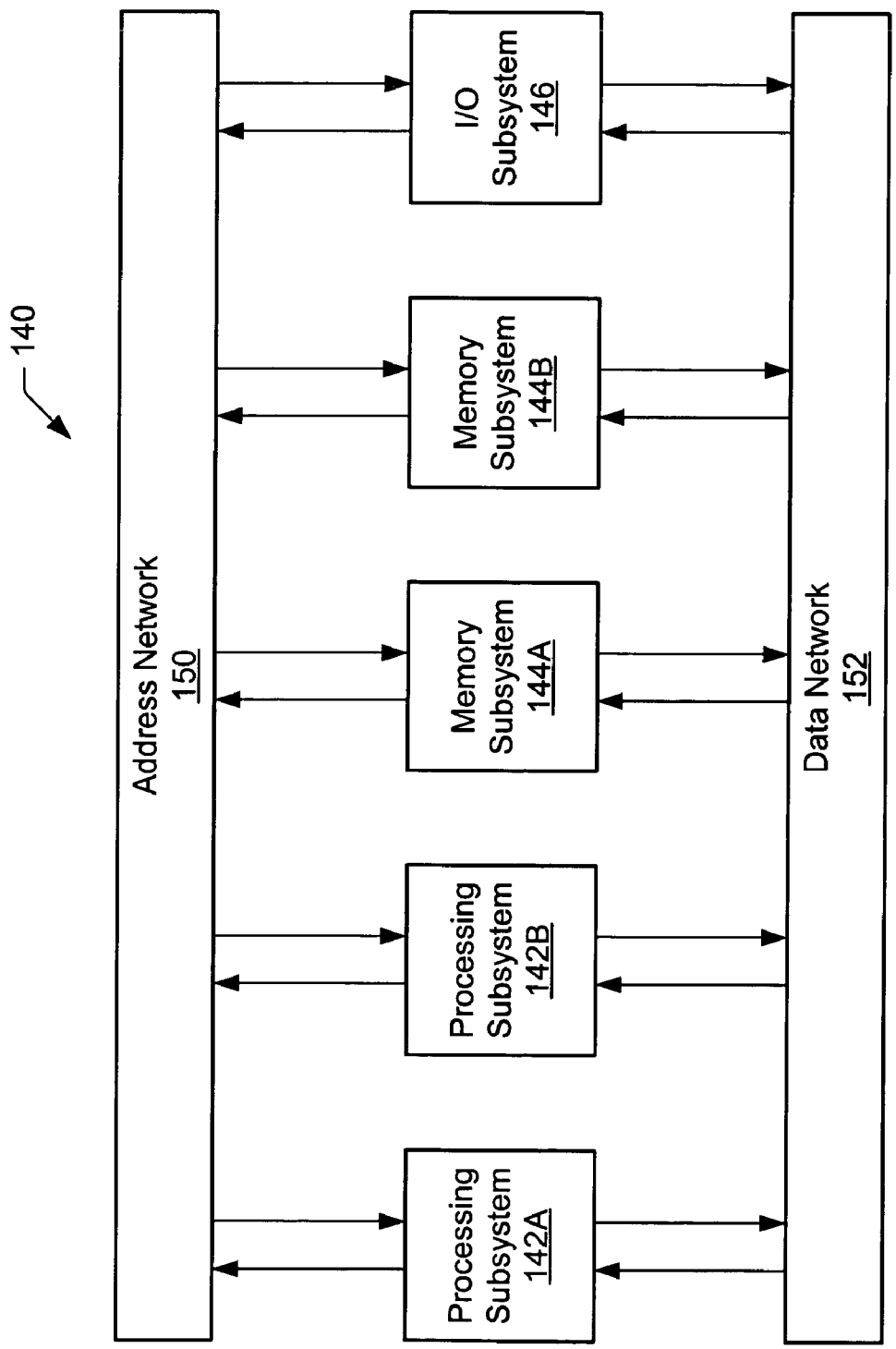
FIG. 1 is a block diagram of a multiprocessing computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 140 is shown. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 are referred to as a client device. It is noted that, although five client devices are shown in FIG. 1, embodiments of computer system 140 employing any number of client devices are contemplated. Elements referred to herein with a particular reference number followed by a letter will be collectively referred to by the reference number alone. For example, processing subsystems 142A–142B will be collectively referred to as processing subsystems 142.

Generally speaking, each of processing subsystems 142 and I/O subsystem 146 may access memory subsystems 144. Devices configured to perform accesses to memory subsystems 144 are referred to herein as "active" devices. Each client in FIG. 1 may be configured to convey address transactions on address network 150 and data on data network 152 using split-transaction packets. Processing subsystems 142 may include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of computer system 140 may be assigned to a particular memory subsystem 144, referred to as the home subsystem of the address.

I/O subsystem 146 is illustrative of various I/O functionality. For example, I/O subsystem 146 is illustrative of any of a variety of specific peripheral devices such as an input-output bridge, a graphics device, a networking device, etc.

In one embodiment, data network 152 is a point-to-point switched network. However, it is noted that in alternative embodiments other networks may be used. In a switched network, a particular client device communicates directly with a second client device via a dedicated point-to-point link that may be established through a switched interconnect mechanism. To communicate with a third client device, the particular client device utilizes a different link as established by the switched interconnect than the one used to communicate with the second client device.

In the embodiment of FIG. 1, address network 150 implements a broadcast network in which address transactions are conveyed to all client devices. Address network 150 may be embodied physically using a point-to-point, switched network configured to broadcast address transactions. Address network 150, as well as data network 152, may be implemented using a multi-stage switching hierarchy. In alternative embodiments, address network 150 may be implemented using a common bus structure. Address network 150 may be embodied in hardware that is separate from data network 152, or in hardware that is shared with data network 152. It is noted that address network 150 may serve as an ordering point for transactions to a given cache block, and thus that it is possible to refer to such transactions as occurring "before" or "after" each other.

Address network 150 accommodates communication between processing subsystems 142, memory subsystems 144, and I/O subsystem 146. Operations upon address network 150 are generally referred to as address transactions. When the destination of an address transaction is a storage location within a memory subsystem 144, the destination may be specified via an address conveyed with the transaction upon address network 150. Subsequently, data corresponding to the transaction on the address network 150 may be conveyed upon data network 152.

In one embodiment, read-to-share (RTS) transactions may be initiated by active devices upon address network 150 to request read-only copies of cache blocks. Similarly, read-to-own (RTO) transactions may be initiated by active devices to request writable copies of cache blocks. Other coherence transactions may similarly be initiated by active devices upon address network 150, as desired.

FIG. 2 is a chart illustrating various transactions, including a description for each, that may be supported by one embodiment of computer system 140. As illustrated, in addition to read-to-share and read-to-own transactions, further coherence transactions that may be supported include read-stream (RS) transactions, write-stream (WS) transactions, write-back (WB) transactions, and write-back shared (WBS) transactions. A read-stream transaction requests a read-once copy of a cache block. A write-stream transaction is a request to write an entire cache block and send the cache block to memory. A write-back transaction is a request to send a cache block from an owning device to memory, where the owning device does not keep a copy. Finally, a write-back shared transaction is a request to send a cache block from an owning device to memory, where the owning device keeps a read-only copy. Active devices may also be configured to initiate other transaction types on address network 150 such as, for example, I/O read and write transactions and interrupt transactions. It is noted that transactions may be conveyed upon address network 150 in the form of encoded packets including a specified address. Data packets conveyed on data network 152 may be associated with corresponding address transactions using transaction IDs, as discussed below.

As will be described in further detail below, computer system 140 further supports a read-to-write-back (RTWB) transaction to allow I/O subsystem 146 (or other devices) to perform a write to a portion of a cache block without gaining ownership of the cache block and requiring that it respond to foreign requests for the cache block. In one embodiment, in response to I/O subsystem 146 initiating a read-to-write-back transaction, the device owning the cache block conveys the cache block to I/O subsystem 146, and the I/O subsystem 146 may perform partial or entire writes to the cache block. Subsequently, the cache block is written back to a memory subsystem 144 from I/O subsystem 146. The system is implemented such that these operations may be viewed logically as an atomic operation with respect to other coherence transactions to the same cache block, and thus the I/O subsystem 146 need not become the owner of the cache line during performance of the read-to-write-back transaction. Accordingly, the design of the I/O subsystem 146 may be simplified while still providing the overall functionality as supported by the read-to-write-back transaction. Additional details regarding these operations will be provided further below.

In one embodiment, cacheable transactions result in at least one packet being received by the initiating client on the data network 152. In addition, some transactions may require that a packet be sent from the initiating client on the data network 152. FIG. 3 illustrates data packet transfers on data network 152 that may result from various transactions in accordance with one embodiment of computer system 140. A PRN data packet type is a pull request, sent from the destination of a write transaction to the source of the write transaction, to send data. An ACK data packet type is a positive acknowledgment from an owning device allowing a write stream transaction to be completed. A NACK data packet type is a negative acknowledgment to memory aborting a WB, WBS, or INT transaction.

When an initiator initiates a transaction, the address packet for that transaction may include a transaction ID formed by the initiator's device ID and a packet ID, which is assigned by the initiator. The DATA, ACK and/or PRN packets that the initiator receives may be routed to the initiator through data network 152 by placing the initiator's device ID in the packets' routing prefix. In addition, the DATA, ACK and/or PRN packets may contain a destination packet ID field which matches the packet ID assigned by the initiator, thus allowing the initiator to match the DATA, ACK, and/or PRN packet to the correct transaction. Furthermore, PRN packets may include a pull ID consisting of the source's device ID and a packet ID, which is assigned by the source (that is, the client which sent the PRN packet). After receiving a PRN packet, the initiator may send a DATA or NACK packet to the source of the PRN. This DATA or NACK packet may be routed by placing the device ID of the source of the PRN in the packet's routing prefix, and may contain a destination packet ID field which allows it to be matched with the correct PRN (in addition, the packet may include a flag which indicates that it was sent in response to a PRN, thus preventing confusion between transaction IDs and pull IDs).

In one embodiment, the ACK packet which may be sent in response to a WS does not contain any data. The ACK packet may be used to indicate the invalidation of the previous owner. The PRN packet which an initiator receives in response to a cacheable transaction is sent by the memory device that maps the cache block. The DATA or NACK packet which the initiator sends is sent to the memory device that maps the cache block (which is also the source of the PRN received by the initiator).

As illustrated in FIG. 3, the initiator may receive separate DATA and PRN packets for a RTWB transaction. However, when the owner of the cache block is the memory device that maps the cache block, these two packets would be sent by the same client. Thus, in one embodiment, instead of sending two packets in this situation, a single DATAP packet may be sent which combines the information of a DATA packet and a PRN packet. Similarly, a single PRACK packet, which combines the information of a PRN packet and an ACK packet, may be sent in response to a WS transaction when the owner of the cache block is the memory device that maps the cache block. Finally, in those cases where the initiator is the owner of the cache block, the initiator may not send a DATA or ACK packet to itself (this can be viewed logically as a transmission of a DATA or ACK packet from the initiator to itself which does not leave the initiator). Similarly, in those cases where the initiator is the memory device that maps the cache block, the initiator may not send a PRN packet to itself, nor need it send a DATA or NACK packet to itself.

In the embodiment of FIG. 1, noncacheable transactions may similarly result in at least one packet being received by the initiating client from the data network, and some transactions may require that a packet be sent from the initiating client device on the data network. FIG. 4 illustrates various noncacheable transaction types that may be supported in one embodiment of computer system 140, along with resulting data packets types that may be conveyed on data network 152. The columns in FIG. 4 are indicative of the sequence of packets sent on the address and data networks, in order from left to right.

The DATA, PRN, or NACK packets that an initiator may receive in response to noncacheable transaction types are routed to the initiator through data network 152 and may be matched to the correct transaction at the receiver through the use of transaction IDs, as was described for cacheable data transfers. Similarly, the DATA packets that the initiator sends may be routed to their destination and matched to the correct transaction at their destination through the use of pull IDs, as was described for cacheable transactions.

For RIO and WIO transactions, the DATA, and/or PRN packets which the initiator receives are sent from the client that maps the block. For INT transactions, the PRN or NACK packet which the initiator receives is sent from the target of the interrupt (which may be specified in an address field of the INT packet). When the initiator sends a DATA packet, it sends the DATA packet to the source of the PRN which it received. It is noted that when the initiator would be both the source and destination of a DATA, PRN, or NACK packet, no DATA, PRN, or NACK packet needs to be sent. It is also noted that when an initiator receives a PRN packet in response to an INT transaction, the initiator sends a data packet. When the initiator receives a NACK packet in response to an INT transaction, the initiator may not send any packet on the data network.

As will be described in further detail below, in one embodiment computer system 140 is configured to satisfy the following two properties (where a packet is defined to be "received" when any changes in ownership status and/or access rights in response to the packet at the receiving processor have been made, if necessary, pursuant to the coherence protocol):

1) Ordered broadcasts: if an address broadcast B1 is received before another address broadcast B2 at a processor P1 (or other active device), then B1 is also received before B2 at every other processor P2 (and every other active device), and 2) Synchronized broadcasts: if a data packet D1 is sent from a processor P1 after P1 received an address broadcast B1, and if D1 is received at a processor P2, then P2 receives B1 before P2 receives D1.

Computer system 140 employs a cache coherence protocol to provide a coherent view of memory for clients with caches. For this purpose, state information for each cache block may be maintained in each active device. The state information specifies the access rights of the active device and the ownership responsibilities of the active device.

The access right specified by the state information for a particular cache block is used to determine whether the client device can commit a given operation (i.e., a load or a store operation) and constraints on where that operation can appear within one or more partial or total orders. In one embodiment, the memory access operations appear in a single total order called the "global order". In such an embodiment, these constraints upon where an operation can be placed in the global order can be used to support various well-known memory models, such as, for example, a sequentially consistent memory model or total-store-order (TSO), among others.

The ownership responsibility specified by the state information for a particular cache block indicates whether the client device is responsible for providing data of the cache block to another client that requests it. A client device owns a cache block if it is responsible for providing data to another client which requests it.

In one embodiment, the coherence protocol employed by computer system 140 is associated with the following properties:

1) Changes in ownership status occur in response to the reception of address packets. Sending address packets, sending data packets, and receiving data packets do not affect the ownership status.

2) An active device may own a cache block without having the data associated with that ownership responsibility.

3) Access rights transition with receiving address packets, sending data packets, and receiving data packets. Sending address packets does not affect the access rights (although it may affect the way in which other packets are processed).

4) An active device which has an access right to a cache block always has the data associated with that access right.

5) Reception of address packets is not blocked based on the reception of particular data packets. For example, it is possible to receive a local read request packet before the data being requested is also received.

Since access rights and ownership status can transition separately in the protocol employed by computer system 140, various combinations of coherence states are possible. FIGS. 5A and 5B illustrate types of access rights and ownership status that are possible in one embodiment of computer system 140. FIG. 5C illustrates possible combinations of access rights and ownership status. It is noted that these combinations differ from those of traditional coherence protocols such as the well-known MOSI protocol. It is also noted that other specific forms of access rights may be defined in other embodiments.

As illustrated in FIG. 5A, the W (Write) access right allows both reads and writes. The A (All-Write) access right allows only writes, and requires that the entire cache block be written. The R (Read) access right allows only reads. The T (Transient-Read) access right allows only reads; however, unlike reads performed under the W or R access rights, reads performed under the T access right may be reordered, as discussed below. Finally, the I (Invalid) access right allows neither reads nor writes. When the system is first initialized, all active devices have the I access right for all cache blocks. As will be discussed further below, when a cache block is in the A access right state, because the entire cache block must be modified, the data contained in the cache block prior to this modification is not needed and may not be present. Instead, an ACK packet, which acts as a token representing the data, must have been received if the data is not present.

As illustrated in FIG. 5B, an active device may have an O (owner) ownership status or an N (non-owner) ownership status with respect to a given cache block. In either state, data corresponding to the cache block may or may not be present in the cache.

Once an active device has acquired a given access right, it may exercise that access right repeatedly by performing multiple reads and/or writes, until it loses the access right. It is noted that for access rights other than A (All-Write), an active device may neither read nor write the given cache block, even though its access right allows it to do so. The A access right requires that the entire block be written, so the active device must perform at least one write to each byte in the block.

In the embodiment of FIG. 1, changes in access rights may occur in response to receiving address packets, sending data packets, or receiving data packets. Generally speaking, and as will be described in further detail below, when a request transfers exclusive access to a cache block from a processor P1 to a processor P2, the sending of the data from P1 terminates P1's access right to the block and the reception of the data at P2 initiates its access right. When a request changes exclusive access to a cache block at a processor P1 to a shared state (i.e., each having a read access right) with a processor P2, the sending of the data from P1 terminates P1's write access right (though it can continue to read the cache block) and the arrival of the data at P2 initiates its shared access right. When a request transfers a cache block from a shared state to exclusive access at a processor P2, the access rights at all processors other than P2 and the processor which owns the cache block (if any) are terminated upon reception of the broadcast request, the access right of the processor that owns the cache block (if there is one) is terminated when it sends the data, and the write access right at P2 is initiated once P2 has received the data from the previous owner (or from memory). Finally, when a request adds a processor P2 to a set of processors that is already sharing a cache block, no processor loses access rights and P2 gains the read access right when it receives the data.

Ownership responsibilities may transition in response to the reception of address packets. In the embodiment of FIG. 1, sending and receiving data packets do not affect ownership responsibilities. FIG. 6 is a chart illustrating ownership transitions in response to particular transactions in one embodiment of computer system 140. In FIG. 6, "previous owner" indicates that ownership is unchanged, "initiator" indicates that the client which initiated the transaction becomes the owner, and "memory" indicates that the memory subsystem 144 which maps the cache block becomes the owner. The owner of the cache block is either an active device or the memory device which maps the cache block. Given any cachable transaction T which requests a data or ACK packet, the client that was the owner of the cache block immediately preceding T will send the requested data or ACK packet. When the system is first initialized, memory is the owner for each cache block.

Figure 7C:
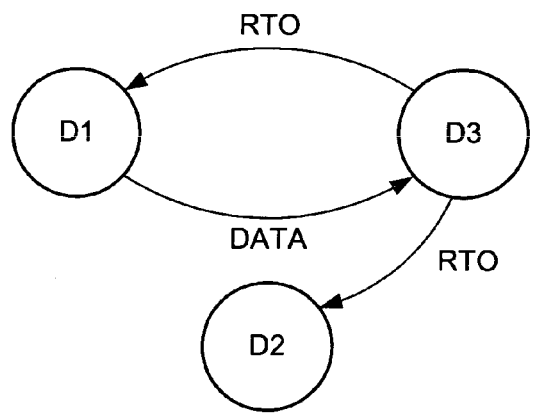

The transitioning of access rights and ownership responsibilities of client devices in one embodiment of computer system 140 may be better understood with reference to the exemplary coherence operations depicted in FIGS. 7A–7H. FIG. 7A illustrates a situation in which an active device D1 has a W access right and ownership, and an active device D2 initiates an RTS in order to obtain the R access right. In this case, D1 will receive the RTS packet from D2 through address network 150. In response to the RTS, D1 sends a corresponding data packet (containing the requested data) to device D2. It is noted that D1 can receive additional address and data packets before sending the corresponding data packet to D2. When D1 sends the corresponding data packet to D2, D1 loses its W access right, and changes its access right to an R access right. When D2 receives the corresponding data packet, it acquires an R access right (D2's access right was previously I). D1 continues to maintain ownership of the cache block.

FIG. 7B illustrates a situation in which an active device D1 has a W access right and ownership, and an active device D2 initiates an RTO transaction in order to obtain a W access right. In this case D1 will receive the RTO packet from D2 over address network 150. As a result, D1 changes its ownership status to N (not owner) and sends a corresponding data packet to D2. It is noted, however, that D1 can receive additional address and/or data packets before sending the corresponding data packet to D2. It is also noted that D2 also receives its own RTO via address network 150. When D1 sends the corresponding data packet to D2, D1 loses its W access right, and changes its right to an I access right. When D2 receives its own RTO via address network 150, its ownership status changes to O (owned). When D2 receives the corresponding data packet, it acquires a W access right.

FIG. 7C illustrates a situation in which an active device D1 has an R access right and ownership, active device D2 also has an R access right (but not ownership), and active device D3 issues an RTO in order to obtain a W access right (D3 may initially have either an I or R access right). In this case, D1 will receive the RTO from D3 via address network 150. As a result, D1 changes its ownership status to N and sends a corresponding data packet to D3. It is noted, however, that D1 can receive additional address and data packets before sending the corresponding data packet to D3. When D1 sends the corresponding data packet to D3, D1 changes its access right to an I access right. In addition, D2 will also receive the RTO via address network 150. When D2 receives the RTO, it changes its R access right an I access right. Furthermore, when D3 receives its own RTO via address network 150, its ownership status is changed to O. When D3 receives the corresponding data packet, it acquires a W access right. It is noted that the corresponding data packet and the local RTO may be received by D3 before the invalidating RTO packet arrives at D2. In this case, D2 could continue to read the cache block even after D3 has started to write to it.

Figure 7D:
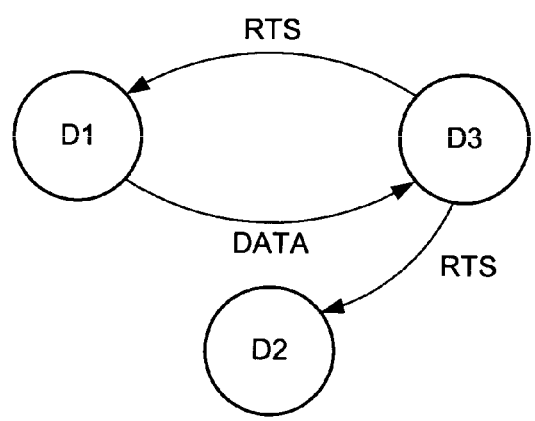

FIG. 7D illustrates a situation in which an active device D1 has an R access right and ownership, active device D2 has an R access right, and active device D3 issues an RTS in order to obtain the R access right. In this case, D1 will receive the RTS from D3 via the address network 150. As a result, D1 sends a corresponding data packet to D3. When D3 receives the corresponding data packet, its access right changes from an I access right to an R access right. The reception of the RTS at D1 and D2 does not cause a change in the access rights at D1 or D2. Furthermore, no change in ownership results.

In the case of WS (Write Stream) transaction, in which an entire cache block is written by an active device and sent to memory, the device performing the WS may receive an ACK packet from the processing subsystem 142 (or memory subsystem 144) that most recently (in address broadcast order) owned the cache block. It is noted that this ACK packet may be in place of a regular data message (and in fact a data message could be used), and that only one such ACK message may be sent in response to the WS.

Figure 7E:
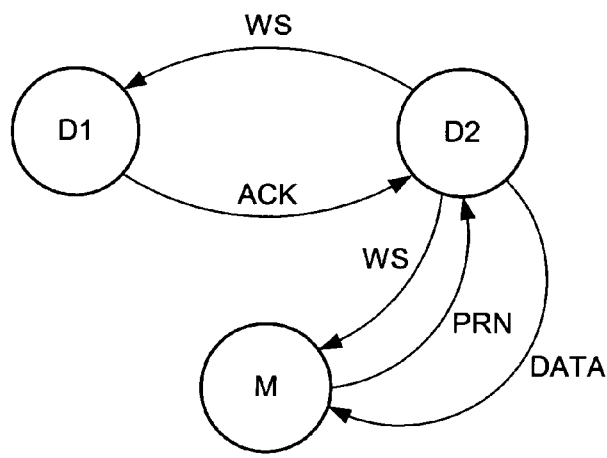

FIG. 7E illustrates a situation in which an active device D1 has an R or W access right and ownership, and an active device D2 issues a WS transaction. As shown, the WS transaction is received by D1 as well as the memory subsystem M that maps the cache block through address network 150. As a result, D1 sends a corresponding ACK packet to D2. It is noted, however, that D1 can receive additional address and data packets before sending the corresponding ACK packet to D2. When D1 sends the corresponding ACK packet to D2, D1 changes its access right to an I access right. When D2 receives the ACK packet from D1, its access right changes to A (All-Write). In addition, the memory subsystem (M) that maps the cache block forwards a PRN packet on data network 152 to D2. When D2 writes to the entire cache block, D2 forwards a data packet to the memory subsystem M. Upon receipt of the WS transaction through address network 150, D1 changes its ownership status to N (not-owned), and the memory subsystem M changes its ownership status to owned.

Figure 7F:
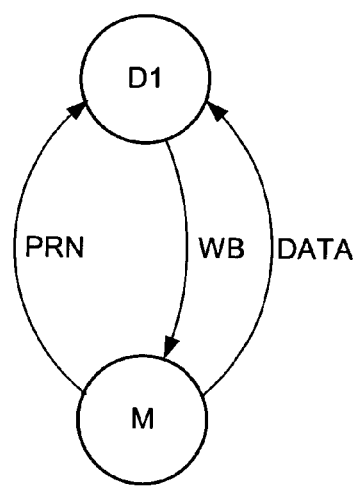

FIG. 7F illustrates a situation in which an active device D1 has a W access right and ownership, and issues a WB transaction in order to write back data to memory. The memory subsystem (M) that maps the cache block receives the WB packet through address network 150, and responsively forwards a PRN packet through data network 152 to D1. As a result, D1 sends a corresponding data packet to memory M. It is noted that D1 can receive additional address and/or data packets before sending the corresponding data packet to memory M. When D1 receives its own WB through address network 150, its ownership status changes to N. When D1 sends the corresponding data packet to memory M, its access right is changed to an I access right. Following this sequence of transactions, memory M becomes the owner of the cache block. WBS (write back shared) transactions may be handled similarly.

Figure 7G:
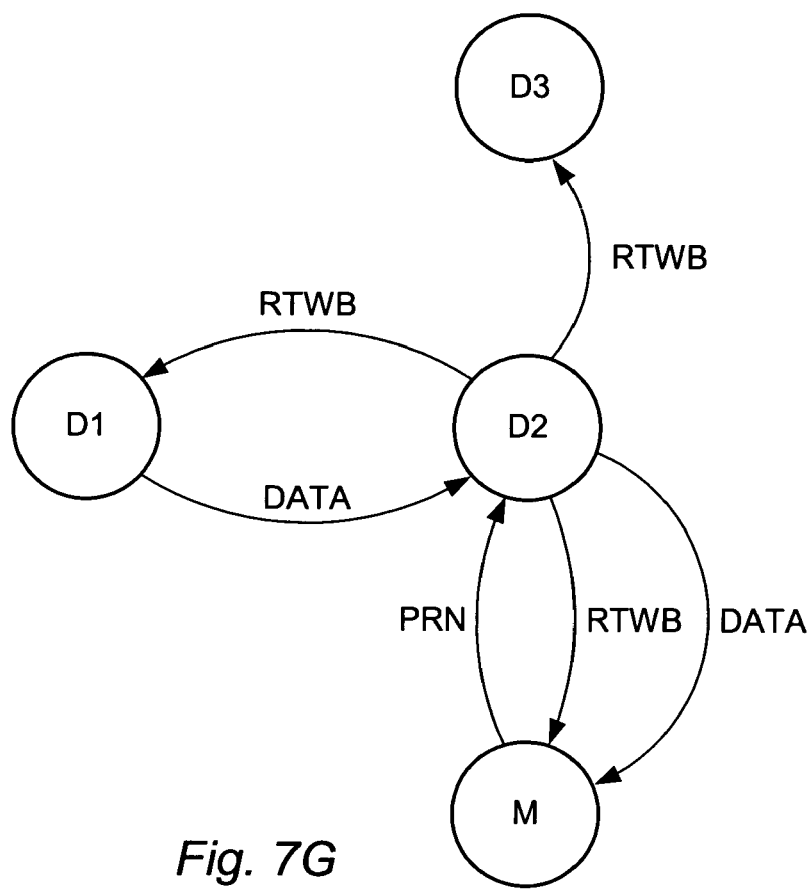
Figure 7H:
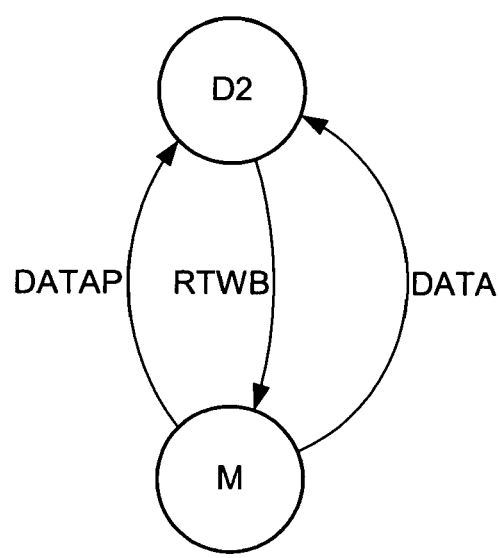

FIGS. 7G and 7H illustrate exemplary read-to-write-back transactions. More particularly, FIG. 7G illustrates a situation in which an active device D1 has an R or W access right and ownership, and an active device D2 (such as I/O subsystem 146) issues a RTWB transaction. As shown, the RTWB transaction is received by D1 as well as the memory subsystem M that maps the cache block through address network 150. The RTWB transaction is also received by other active devices, such as device D3 as illustrated, which may have an R access right to the cache block. In response to receiving the RTWB transaction, device D3 (and any other device with an R access right) transitions its access right to I (invalid). In addition, device D1 changes its ownership status to N (not owned), and memory subsystem M changes its ownership status for the corresponding cache block to O (owned). Memory subsystem M forwards a PRN packet through data network 152 to D2, and D1 sends a corresponding data packet to D2. It is noted that D1 can receive additional address and/or data packets before sending the corresponding data packet to D2. When D1 sends the corresponding data packet to D2, D1 changes its access right to an I access right. In response to receiving the corresponding data packet from D1 (as well as the PRN packet from memory M), D2 may perform one or more partial or complete writes to the cache line. Subsequently, the modified data is transmitted from D2 to memory M. This data packet may be routed using the device ID and destination packet ID provided with the PRN packet, as discussed above. This completes the RTWB transaction.

It is noted that while the RTWB transaction allows device D2 to perform partial writes to the cache block, device D2 does not gain ownership of the cache line. Accordingly, device D2 need not respond to foreign transactions to the cache block. As a result, the design of device D2 may be simplified while allowing for various performance benefits that may be attained by the resulting operations.

It is further noted that following reception of the RTWB transaction, access rights to the cache block in any other active devices are invalidated. If any foreign coherence transaction to the cache block is initiated while the RTWB transaction is pending, resulting read or write access rights to the cache block will not be granted until after the RTWB transaction completes and the corresponding data can be forwarded to the requesting device from memory subsystem M. The handling of such transitory events may be controlled by a transitory state controller that may be employed within memory subsystem M, as will be discussed in further detail below.

FIG. 7H illustrates another situation in which memory subsystem M is the owner of a cache block and device D2 initiates an RTWB transaction. In response to receiving the RTWB transaction, memory M may transmit a DATAP packet to device D2 which may include both the data of the data block and the information of a PRN packet. Alternatively, separate packets may instead be forwarded to device D2, one containing the data of the data block and the other in the form of a PRN packet. In response to receiving the DATAP packet, device D2 may perform partial or entire writes to the cache line. In accordance with the previous description, device D2 subsequently forwards a data packet including the modified data to memory subsystem M. This completes the RTWB transaction. Similar to the operations illustrated by FIG. 7G, device D2 does not gain ownership of the cache block.

For the exemplary transactions described above in conjunction with FIGS. 7A–7H, an owning device may not send a corresponding data packet immediately in response to a transaction (such as an RTO or RTS) initiated by another device. In one embodiment, a maximum time period (e.g., maximum number of clock cycles, etc.) may be used to limit the overall length of time an active device may expend before sending a responsive data packet.

The synchronized broadcast property identified above could be achieved using various mechanisms. For example, the synchronized broadcast property could be achieved by creating a globally synchronous system running on a single clock, and tuning the paths in address network 150 to guarantee that all broadcasts corresponding to a given transaction arrive at all devices upon the same cycle. In such a system, address packets may be received without buffering them in queues. While such implementations are possible, it may instead be desirable to allow for higher communication speeds using source-synchronous signaling, in which a source's clock is sent along with a particular packet. In such implementations, the cycle at which the packet will be received may not be known in advance. In addition, it may further be desirable to provide queues for incoming address packets to allow devices to temporarily receive packets without flow controlling the address network 150.

Figure 8:
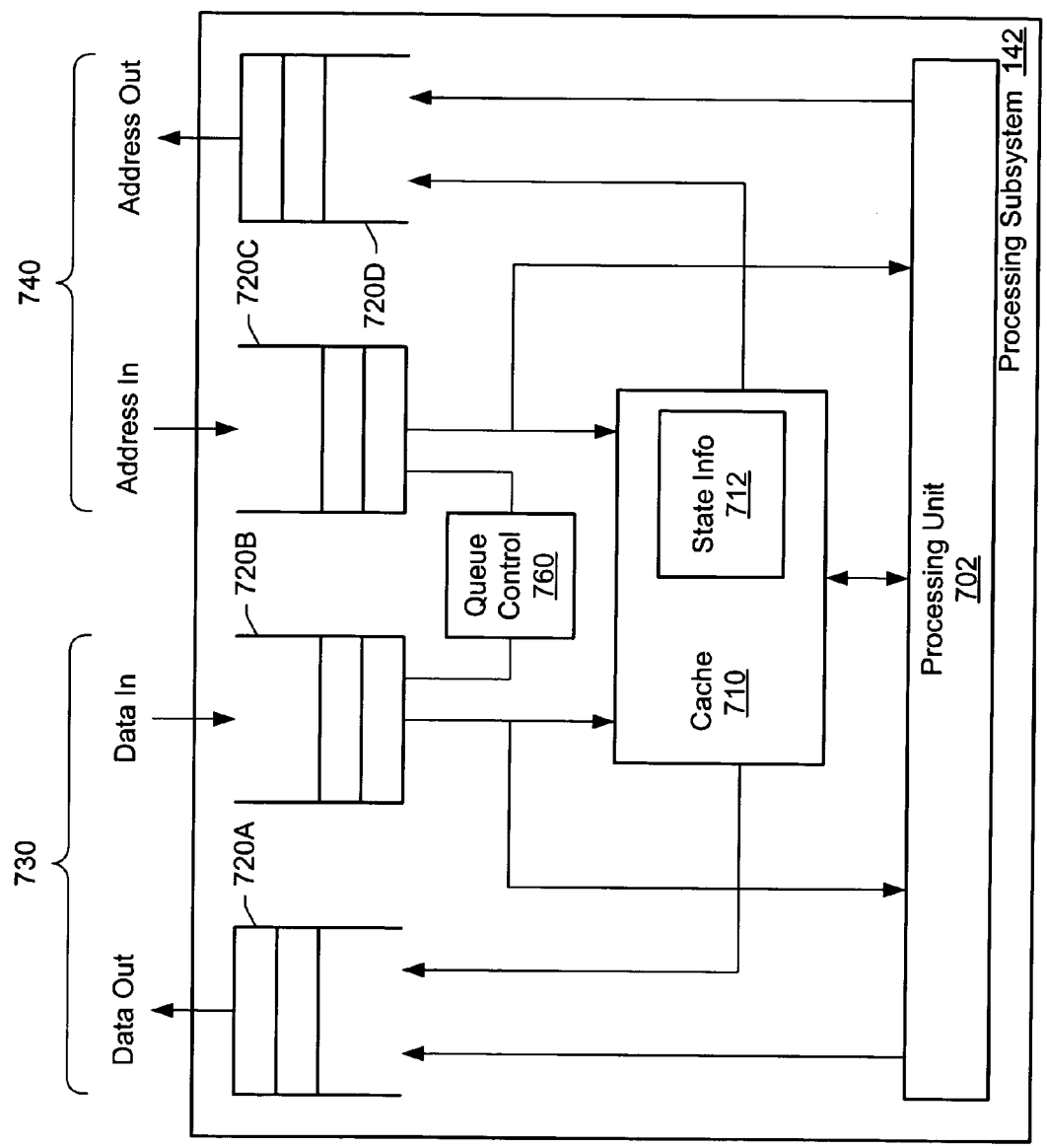
FIG. 8 is a block diagram illustrating details of one embodiment of each of the processing subsystems of FIG. 1.

Details regarding one implementation of computer system 140 which maintains the synchronized broadcasts property without requiring a globally synchronous system and which allows address packets to be buffered will thus be described next in conjunction with FIG. 8. FIG. 8 is a block diagram illustrating details of one embodiment of each of the processing subsystems 142 of computer system 140. Included in the embodiment of FIG. 8 are a processing unit 702, cache 710, and queues 720A–720D. Queues 720A–720B are coupled to data network 152 via data links 730, and queues 720C–720D are coupled to address network 150 via address links 740. Each of queues 720 comprises a plurality of entries each configured to store an address or data packet. Processing unit 702 is shown coupled to cache 710. Cache 710 may be implemented using a hierarchical cache structure.

Processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular cache block within cache 710, as discussed above. In accordance with the foregoing, if processing unit 702 attempts to read or write to a particular cache block, and cache state info 712 indicates processing unit 702 does not have adequate access rights to perform the desired operation, an address transaction comprising a coherency request may be inserted in address out queue 720D for conveyance on address network 140. Subsequently, data corresponding to the cache block may be received via data in queue 720B.

In addition, processing subsystem 142 may receive coherency demands via address in queue 720C, such as a rad-to-own or read-to-share transaction initiated by another active device (or initiated by itself). If, for example, processing subsystem 142 receives a transaction corresponding to a read-to-own request initiated by a foreign device for a memory block, the corresponding memory block may be returned via data out queue 720A (e.g., if the cache block was owned by the processing subsystem 142), and/or the state information 712 for that block may be changed to invalid, as discussed above. Other coherence transactions such as read-to-write-back transactions as well as non-cacheable transactions may similarly be received through address in queue 720C. Memory subsystems 144 and I/O subsystem 146 may be implemented using similar queuing mechanisms.

The synchronized broadcasts property described above may be maintained by implementing address network 150 and data network 152 in accordance with certain network conveyance properties and by controlling queues 720 according to certain queue control properties. In particular, in one implementation address network 150 and data network 152 are implemented such that the maximum skew between when any broadcast (conveyed on address network 150) arrives at any two different client devices is less than or equal to the minimum latency for any message sent on the data network 152 between any two client devices. Such an implementation results in the following network conveyance property (which is identical to the synchronized broadcasts property, except that it is stated in terms of packet arrivals (i.e., when packets arrive at in queues 720B and 720C) rather than receptions (i.e., when a packet affects ownership status and/or access rights in the receiving device)):

Network Conveyance Property: If a data packet D1 is sent from a processor P1 to a processor P2, and if a broadcast B1 arrives at P1 before D1 is sent, then B1 arrives at P2 before D1 arrives at P2.

In addition to implementing address network 150 and 152 such that the Network Conveyance Property holds, address in queue 720C and data in queue 720B are controlled by a queue control circuit 760 such that packets from the address and data networks are placed in the respective queue upon arrival and are removed (and thus received) in the order they are placed in the queues (i.e., on a first-in, first-out basis). Furthermore, no data packet is removed from the data-in queue 720B for processing until all address packets that arrived earlier than the data packet have been removed from the address-in queue 720C.

In one embodiment, queue control circuit 760 may be configured to store a pointer along with an address packet when it is stored in an entry at the head of the address in queue 720C. The pointer indicates the next available entry in the data in queue 720B (i.e., the entry that the data in queue 720C will use to store the next data packet to arrive). In such an embodiment, address packets are received (i.e., they affect the access rights of corresponding blocks in cache 710) after being popped from the head of address in queue 720C. Queue control circuit 760 may be configured to prevent a particular data packet from being received (i.e., processed by cache 710 in such a way that access rights are affected) until the pointer corresponding to the address packet at the head of the address-in queue 720C points to an entry of data-in queue 720B that is subsequent to the entry including the particular data packet. In this manner, no data packet is removed from the data-in queue 720B for processing until all address packets that arrived earlier than the data packet have been removed from the address-in queue 720C.

In an alternative embodiment, queue control circuit 760 may be configured to place a token in the address in queue 720C whenever a packet is placed in the data in queue 720B.

In such an embodiment, queue control 760 may prevent a packet from being removed from the data in queue 720B until its matching token has been removed from the address in queue 720C. It is noted that various other specific implementations of queue control circuit 760 to control the processing of packets associated with queues 720 are contemplated.

Figure 9:
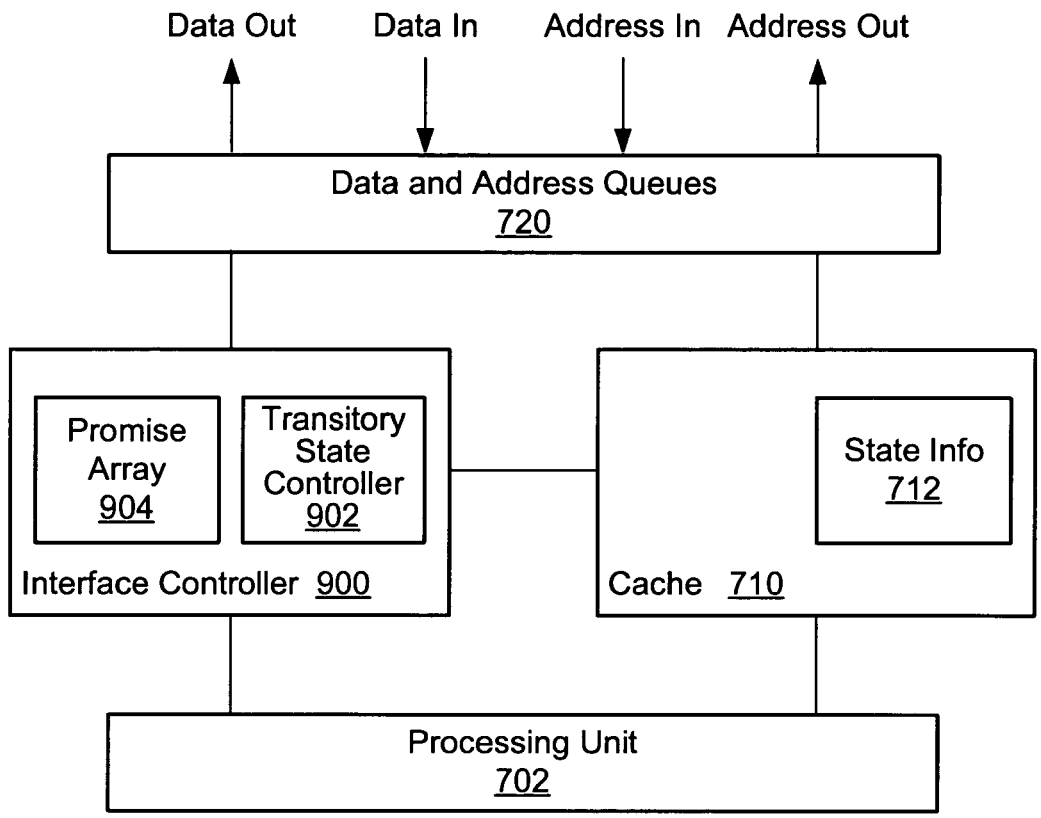
FIG. 9 is a block diagram illustrating further details regarding one embodiment of each of the processing subsystems of FIG. 1.

Turning next to FIG. 9, further details regarding an embodiment of each of the processing subsystems 142 of FIG. 1 are shown. Circuit portions that correspond to those of FIG. 8 are numbered identically.

FIG. 9 depicts an interface controller 900 coupled to processing unit 702, cache 710, and data and address queues 720. Interface controller 900 is provided to control functionality associated with the interfacing of processing subsystem 142 to other client devices through address network 150 and data network 152. More particularly, interface controller 900 is configured to process various requests initiated by processing unit 702 that require external communications (e.g., packet transmissions) to other client devices, such as load and store requests that require the generation of read-to-share and read-to-own transactions. Interface controller 900 is also configured to process communications corresponding to transactions initiated by other client devices. In one particular implementation, interface controller 900 includes functionality to process transactions in accordance with the foregoing description, including that associated with the processing of the coherence operations as illustrated in FIGS. 7A–7H. For this purpose, functionality depicted as transitory state controller 902 is provided within interface controller 900 for processing outstanding local transactions (that is, transactions initiated by processing subsystem 142 that have not reached a stable completed state). To support this operation, information relating to the processing of coherence operations (including state information) may be passed between interface controller 902 and cache 710. Transitory state controller 902 may include multiple independent state machines (not shown), each of which may be configured to process a single outstanding local transaction until completion.

The functionality depicted by transitory state controller 902 may be configured to maintain various transitory states associated with outstanding transactions, depending upon the implementation and the types of transactions that may be supported by the system. For example, from the exemplary transaction illustrated in FIG. 7B, device D2 enters a transitory state IO after receiving its own RTO and prior to receiving a corresponding data packet from device D1. Similarly, device D1 enters transitory state WN in response to receiving the RTO from device D2 that is maintained until the corresponding data packet is sent to device D2. In one embodiment, transitory state controller 902 maintains such transitory states for pending local transactions to thereby control the processing of address and data packets according to the coherence protocol until such local transactions have completed to a stable state.

Referring back to FIG. 5C, it is noted that states WO, RO, RN, and IN are equivalent to corresponding states defined by the well-known MOSI coherence protocol. These four states, in addition to state WN, are stable states. The other states depicted in FIG. 5C are transient and only exist during the processing of a local transaction by interface controller 900. In addition, in one embodiment, the state WN may not be maintained for cache blocks that do not have a local transaction pending since it may be possible to immediately downgrade from state WN to state RN for such cache blocks. As a result, in one particular implementation, only two bits of state information are maintained for each cache block within state information storage 712 of cache 710. Encodings for the two bits are provided that correspond to states WO, RO, RN, and IN. In such an embodiment, transitory state information corresponding to pending transactions may be separately maintained by transitory state controller 902.

Figure 10:
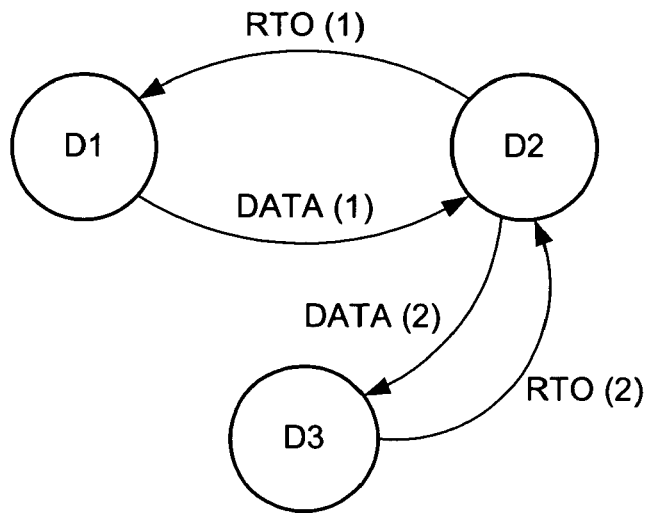
FIG. 10 is a diagram illustrating multiple coherence transactions initiated for the same cache block.

Various additional transitory states may also result when a coherence transaction is initiated by an active device while a coherence transaction to the same cache block is pending within another active device. For example, FIG. 10 illustrates a situation in which an active device D1 has a W access right and ownership, and an active device D2 initiates an RTO transaction in order to obtain a W access right. When D1 receives the RTO packet from D2 through address network 150, D1 changes its ownership status to N (not owner). D2 changes its ownership status to O (owned) when it receives its own RTO through address network 150. It may be possible that another active device D3 subsequently issues another RTO to the same cache block which is received by D2 through address network 150 before a corresponding data packet is received at D2 from D1. In this situation, D2 may change its ownership status to N (not owned) when the second RTO is received. In addition, when D3 receives its own RTO through address network 150, its ownership status changes to O (Owned). When a corresponding data packet is received by D2 from D1, D2's access right changes to a write access right. D2 may exercise this write access right repeatedly, as desired. At some later time, a corresponding data packet may be sent from D2 to D3. When the data is received by D3, it acquires a W access right. Such operations and transitory state transitions may be performed and maintained by the functionality depicted by transitory state controller 902, as needed, based upon the types of transactions that may be supported and the particular sequence of packet transmissions and receptions that may occur, as well as upon the particular coherence methodology that may be chosen for a given implementation.

As illustrated, the interface controller 900 depicted in FIG. 9 may further include a promise array 904. As described above, in response to a coherence transaction, a processing subsystem that owns a cache block may be required to forward data for the cache block to another device. However, the processing subsystem that owns the cache block may not have the corresponding data when the transaction is received. Promise array 904 is configured to store information identifying data packets that must be conveyed to other devices on data network 152 in response to pending coherence transactions as dictated by the coherence protocol.

Promise array 902 may be implemented using various storage structures. For example, promise array 902 may be implemented using a fully sized array that is large enough to store information corresponding to all outstanding transactions for which data packets must be conveyed. In one particular implementation, each active device in the system can have at most one outstanding transaction per cache block. In this manner, the maximum number of data packets that may need to be forwarded to other devices may be bound, and the overall size of the promise array may be chosen to allow for such maximum number of data promises. In alternative configurations, address transactions may be flow-controlled in the event promise array 902 becomes full and is unable to store additional information corresponding to additional data promises. Promise array 902 may include a plurality of entries, each configured to store information that identifies a particular data packet that needs to be forwarded, as well as information identifying the destination to which the data packet must be forwarded. In one particular implementation, promise array 902 may be implemented using a linked list.

Figure 11:
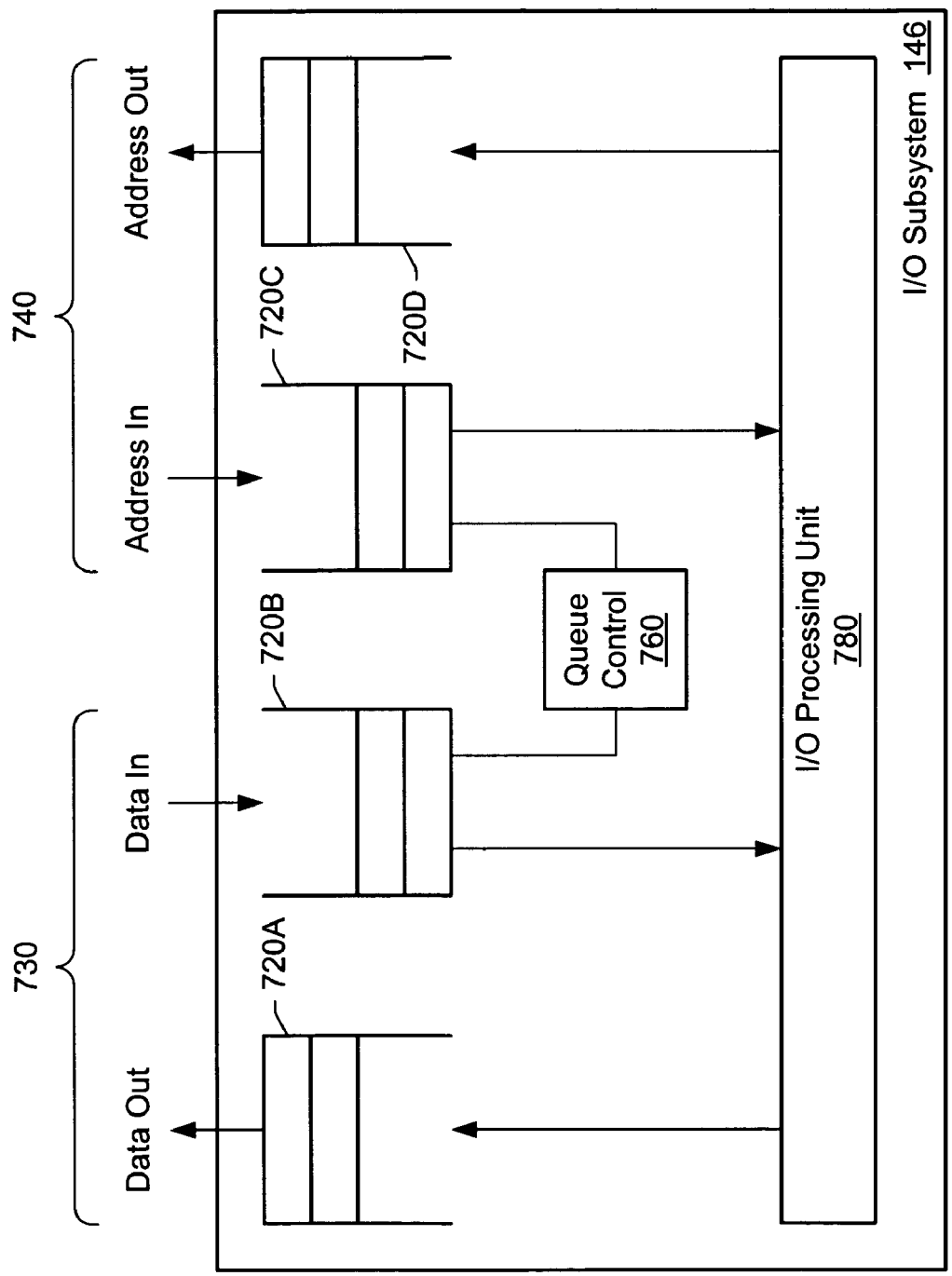
FIG. 11 is a block diagram illustrating details of one embodiment of an I/O subsystem.

FIG. 11 illustrates an I/O subsystem 146 including an I/O processing unit 780 configured to process I/O transactions and to perform various I/O functionality, as desired. For example, I/O processing unit 780 may be configured to perform the functionality of various specific peripheral devices, such as an input-output bridge, a graphics device, or a networking device, among others. I/O processing unit 780 may be advantageously configured to perform read-to-write-back transactions as discussed above. As illustrated, I/O subsystem I/O 146 may additionally include data in/out queues 720A and 720B and address in/out queues 720C and 720D, as well as a queue control circuit 760, which may operate in a manner that is the same as or similar to the operation of the corresponding elements of FIG. 8 described above.

Figure 12:
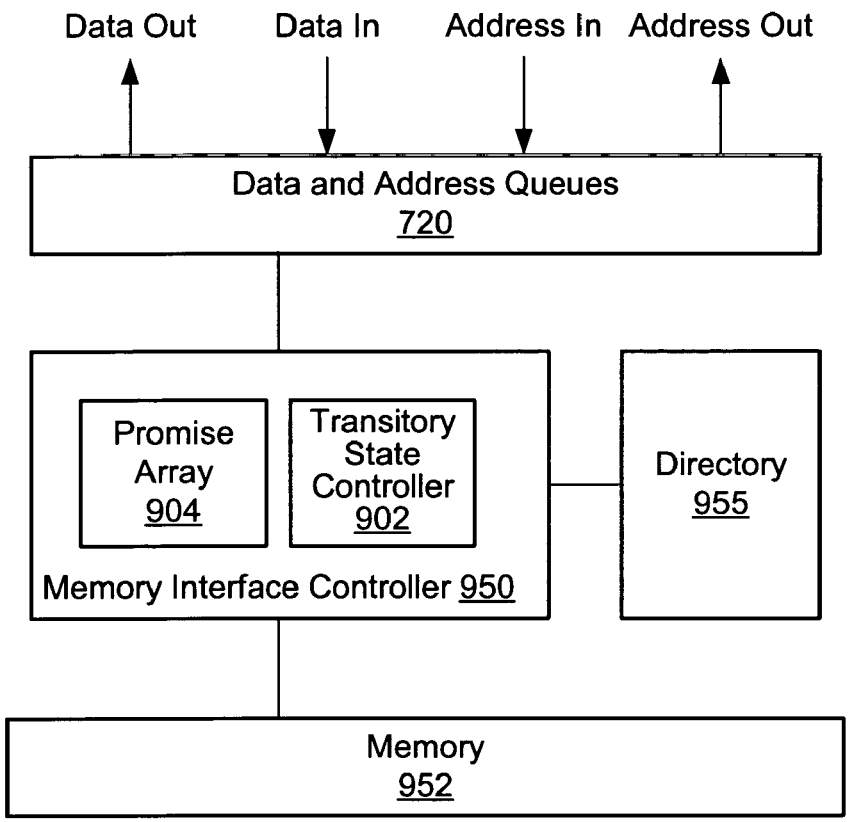
FIG. 12 is a block diagram illustrating details of one embodiment of a memory subsystem.

FIG. 12 illustrates further details of an embodiment of each of the memory subsystems 144 of FIG. 1. Circuit portions that correspond to those of FIG. 9 are numbered identically.

As illustrated, the memory subsystem of FIG. 12 includes a memory interface controller 950 coupled between data and address queues 720 and memory 952. Memory interface controller 950 is configured to process address and data packets associated with queues 720, and to control accesses to memory 952. In various embodiments, memory interface controller 950 may further include a directory 955 containing information indicative of active devices that may own particular cache blocks mapped to memory 952, and information identifying sharers of each data block, as discussed above. Memory interface controller 950 is further illustrated with a transitory state controller 902 and promise array 904 which may also be configured to operate in accordance with the foregoing description. As such, in response to receiving a read-to-write-back (RTWB) transaction as illustrated by, for example, FIGS. 7G and 7H, transitory state controller 902 may operate to identify the memory subsystem as the owner of the cache line, and to respond appropriately to subsequent transactions that may be received, as dictated by the coherence protocol. Similarly, promise array 904 may store information identifying data packets that must be conveyed to other devices in response to such transactions.

Figure 13:
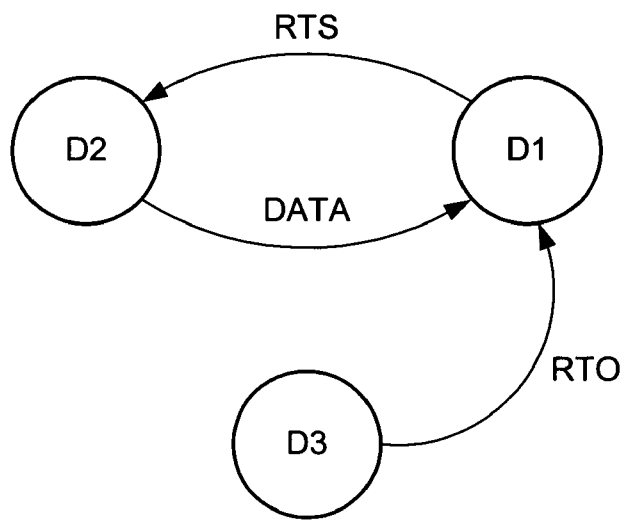
FIG. 13 is a diagram illustrating communications between active devices in accordance with one embodiment of a computer system.

Turning next to FIG. 13, it is noted that systems that employ general aspects of the coherence protocols described above could potentially experience a starvation problem. More particularly, as illustrated, an active device D1 may request a read-only copy of a cache block to perform a load operation by conveying a read-to-share (RTS) transaction upon address network 150. However, as stated previously, a corresponding data packet may not be conveyed to D1 from D2 (i.e., the owning device) until some time later. Prior to receiving the corresponding data packet, device D1 has the cache block in an I (Invalid) state. It is possible that prior to receiving the corresponding data packet, that a device D3 may initiate an RTO (or other invalidating transaction) that is received by D1 ahead of the corresponding data packet. This situation may prevent device D1 from gaining the read access right to the cache block since the previously received RTO may nullify the effect of the first request. Although device D1 may issue another RTS to again attempt to satisfy the load, additional read-to-own operations may again be initiated by other active devices that continue to prevent device D1 from gaining the necessary access right. Potentially, requests for shared access to a cache block could be nullified an unbounded number of times by requests for exclusive access to the cache block, thus causing starvation.

Such a starvation situation can be avoided by defining certain loads as critical loads. Generally speaking, a critical load refers to a load operation initiated by an active device that can be logically reordered in the global order without violating program order. In one embodiment that implements a TSO (Total Store Order) memory model, a load operation is a critical load if it is the oldest uncommitted load operation initiated by processing unit 702. To avoid starvation, in response to an indication that an outstanding RTS corresponds to a critical load and receipt of an intervening foreign RTO transaction to the same block (before a corresponding data packet for the RTS is received) transitory state controller 902 may be configured to provide a T (Transient-Read) access right to the cache block upon receipt of the data packet. The T access right allows the load to be satisfied when the data packet is received. After the load is satisfied, the state of the cache block is downgraded to I (Invalid). This mechanism allows critical loads to be logically reordered in the global order without violating program order. The load can be viewed as having logically occurred at some point right after the owner (device D2) sends the corresponding data packet to D1 but before the device performing the RTO (device D3) receives its corresponding data packet. In this manner, the value provided to satisfy the load in device D1 includes the values of all writes prior to this time and none of the values of writes following this time.

In one particular implementation, processing unit 702 may provide an indication that a load is the oldest uncommitted load when the load request is conveyed to interface controller 900. In another embodiment, a load may be indicated as being a critical load if it is the oldest uncommitted load at the time the local RTS is conveyed on address network 150. In still a further embodiment, a load may be indicated as being a critical load if it is the oldest uncommitted load at the time the foreign invalidating RTO is received.

Numerous variations in the system described above are contemplated. For example, while the address network 150 described above implements a broadcast network, other systems are contemplated in which address transactions may be conveyed point-to-point or to subsets of client devices. Such systems may employ general aspects of the protocols described above for transitioning access rights in active devices.

Figure 14:
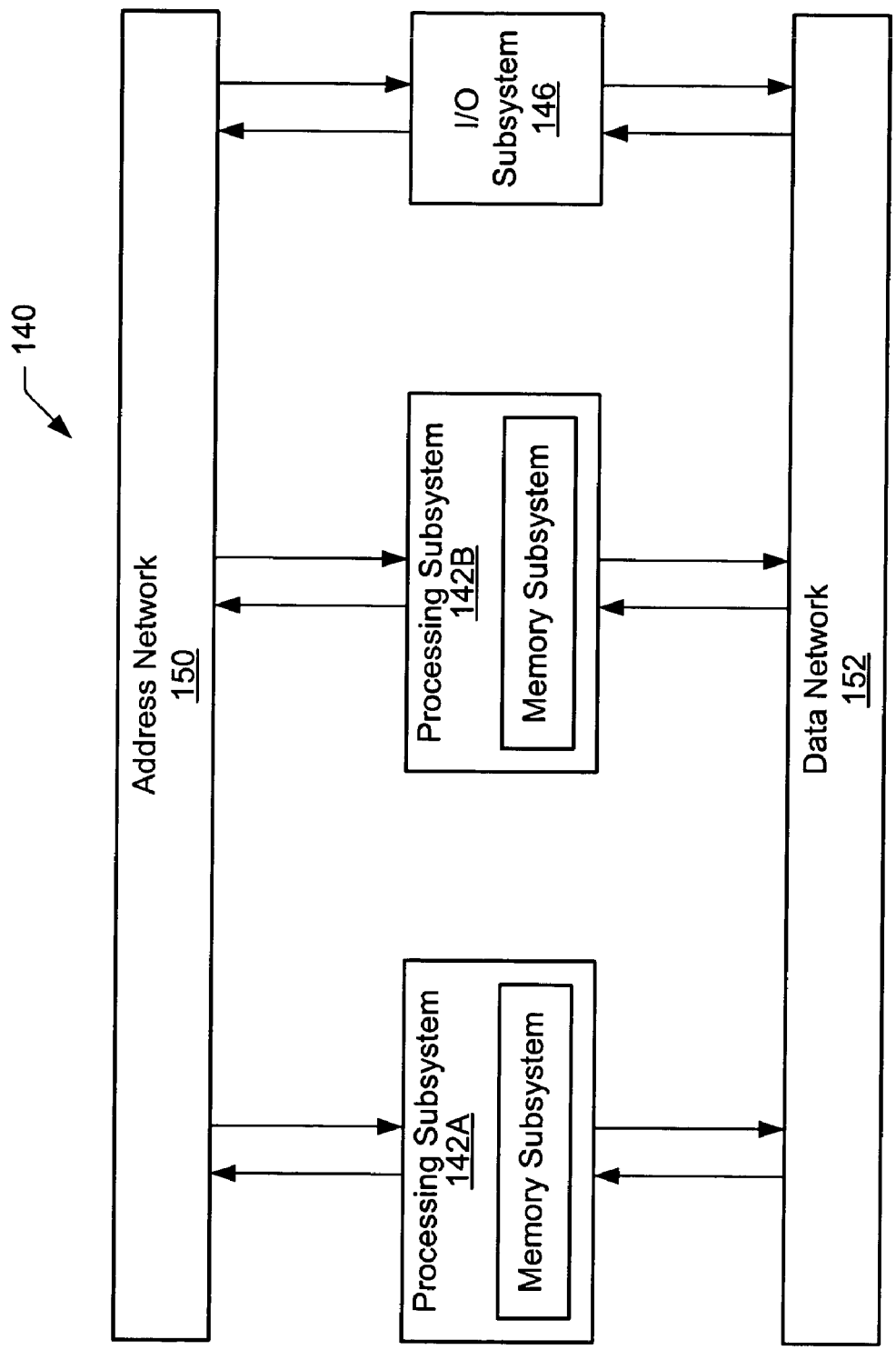
FIG. 14 is a block diagram of another embodiment of a multiprocessing computer system.

In addition, it is noted that embodiments are also possible in which memory subsystems similar to those discussed above are integrated with the functionality of processing subsystems 142, as depicted in FIG. 14. In such embodiments, the conveyance of certain packets on the address and/or data networks as discussed above for particular coherence transactions may not be necessary.

Still further, it is also noted that while in the embodiments described above access rights transition in response to receiving address packets, sending data packets, and receiving data packets, other implementations of computer systems that support read-to-write-back transactions are also possible. For example, in one alternative implementation of computer system 140, coherence transactions may be handled according to a standard coherence protocol such as a MOSI protocol. In such implementations, both ownership status transitions and access right transitions may be made in response to reception of address packets. In response to receiving a read-to-write-back (RTWB) transaction initiated by I/O subsystem 146, the processing subsystem 142 (or memory subsystem 144) that owned the cache line may forward the data to I/O subsystem 146, and the I/O subsystem 146 may perform partial or entire writes to the cache block and subsequently write the cache block back to the memory subsystem 144. These operations are handled atomically, and I/O subsystem 146 does not become an owner of the cache line. Instead, the memory subsystem that maps the cache line, for example, becomes the owner of the cache line in response to reception of the read-to-write-back transaction, and the granting of access rights to other devices may be blocked until completion of the read-to-write-back transaction.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A computer system comprising:
   a memory subsystem;
   a processing subsystem including a cache memory for caching data mapped to said memory subsystem;
   a device configured to generate a read-to-write-back transaction for a given cache block, wherein said processing subsystem is configured to transmit said given cache block to said device in response to said read-to-write-back transaction, and wherein said device is configured to modify said given cache block without gaining ownership of said given cache block, and wherein said device is configured to write back said given cache block to said memory subsystem after modifying said given cache block; and
   wherein the sending of said given cache block to said device, the modification of said given cache block, and the write-back of said given cache block are performed as an atomic operation with respect to other coherent transactions to said given cache block.

2. The computer system as recited in claim 1 wherein the device is configured to modify a portion of but not all of said given cache block without gaining ownership of said given cache block.

3. The computer system as recited in claim 2 further comprising an address network, wherein said device is coupled to said memory subsystem and to said processing subsystem through said address network, and wherein said read-to-write-back transaction is conveyed from said device to said processing subsystem through said address network.

4. The computer system as recited in claim 3 further comprising a data network, wherein said device is coupled to said memory subsystem and to said processing subsystem through said data network, and wherein said given cache block is conveyed to said device from said processing subsystem through said data network.

5. The computer system as recited in claim 2 wherein said memory subsystem becomes an owner of said given cache block in response to said memory subsystem receiving said read-to-write-back transaction.

6. The computer system as recited in claim 5 wherein said processing subsystem transitions to a non-owner of said given cache block in response to receiving said read-to-write-back transaction.

7. The computer system as recited in claim 6 wherein said processing subsystem transitions an access right to said given cache block to an invalid state in response to sending said given cache block to said device.

8. The computer system as recited in claim 7 further comprising a second processing subsystem, wherein said second processing subsystem transitions an access right to said given cache block from a shared state to an invalid state in response to receiving said read-to-write-back transaction.

9. The computer system as recited in claim 2 wherein said memory subsystem sends a pull request to said device in response to receiving said read-to-write-back transaction.

10. The computer system as recited in claim 8 wherein the pull request includes a device id associated with said memory subsystem.

11. The computer system as recited in claim 10 wherein said pull request further includes a packet id.

12. A method comprising:
  a device generating a read-to-write-back transaction for a given cache block;
  a processing subsystem including a cache memory transmitting said given cache block to said device in response to said read-to-write-back transaction; and
  said device modifying said given cache block without gaining ownership of said given cache block;
  said device writing back said given cache block to a memory subsystem after modifying said given cache block;
  wherein-said transmitting said given cache block to said device, said modification of said given cache block, and said writing back of said given cache block are performed as an atomic operation with respect to other coherent transactions to said given cache block.

13. The method as recited in claim 12 wherein said device modifying said given cache block includes said device modifying a portion of but not all of said given cache block without gaining ownership of said given cache block.

14. The method as recited in claim 12 further comprising a memory subsystem becoming an owner of said given cache block in response to said memory subsystem receiving said read-to-write-back transaction.

15. The method as recited in claim 14 further comprising said processing subsystem transitioning to a non-owner of said given cache block in response to receiving said read-to-write-back transaction.

16. The method as recited in claim 15 further comprising said processing subsystem transitioning an access right to said given cache block to an invalid state in response to sending said given cache block to said device.

* * * * *